United States Patent [19]
Krivoshiev et al.

[11] 3,781,554
[45] Dec. 25, 1973

[54] METHOD AND APPARATUS FOR SORTING TOMATOES BY COLOUR

[75] Inventors: Gueorgui Petrov Krivoshiev; Dimiter Christov Kolev; Christo Yanakiev Tanev; Dimiter Kostadinov Erinkov; Gueorgui Slavov Petrov; Alexander Traykov Vassilev; Petko Slavtchev Vatev, all of Plovdiv, Bulgaria

[73] Assignee: Nii Po Konservna Promishlenost, Plovdiv, Bulgaria

[22] Filed: Sept. 27, 1971

[21] Appl. No.: 183,917

[30] Foreign Application Priority Data
Sept. 26, 1970 Bulgaria ................................ 15729

[52] U.S. Cl............... 250/226, 209/111.6, 356/173
[51] Int. Cl. ............................................. G01j 3/34
[58] Field of Search................ 250/226, 216, 220 R; 209/111.6; 356/173, 195

[56] References Cited
UNITED STATES PATENTS

| | | | |
|---|---|---|---|
| 3,206,022 | 9/1965 | Roberts et al. | 250/226 X |
| 3,385,434 | 5/1968 | Nelson | 209/111.6 |
| 2,988,219 | 6/1961 | Bartlett | 209/111.6 |
| 2,803,754 | 8/1957 | Cox | 209/111.6 X |
| 3,459,951 | 8/1969 | Howarth et al. | 250/226 |

Primary Examiner—Walter Stolwein
Attorney—Karl F. Ross

[57] ABSTRACT

A method of and an apparatus for sorting tomatoes by color wherein a light beam is projected onto each tomato and transmitted light rays are detected on symmetrically opposite sides of the light beam at angles of 135° thereto, the detected rays are combined through a semitranslucent reflector and a ratio of wave lengths is developed which represents the internal coloration as well as surface flaws in the region of the tomato transluminated by the incident and transmitted beams. The tomatoes are sorted by electromagnetic actuators responding to this ratio.

2 Claims, 6 Drawing Figures

METHOD AND APPARATUS FOR SORTING TOMATOES BY COLOUR

This invention relates to a bichromatic method of measuring the integral internal and external color of tomatoes both for consumption in fresh condition and for processing. According to the invention, devices measure the color without damaging the tomatoes (without cutting them) and sort them automatically in several fractions.

The method is based on the spectral characteristics of ray energy, which passes through the tomato, and comprises the measuring of the ratio of the signals corresponding to two wavelengths in the visible region of the spectrum of the light beam, transmitted through the tomato.

The measuring of the integral internal and external color of the tomatoes according to this method is possible because the color information, which is included in the spectral characteristics, relates to both the interior of the tomatoes and their surface layers, as well.

The sorting of tomatoes for consumption in fresh condition according to the interior color is rather important, as it allows a sufficiently exact determination of the period of time, in which the sorted fractions will develop their full color, i.e., it makes it possible to determine the time for transport and storing to ripeness. Sorting according to the internal color is important too for tomatoes intended for the production of puree and tomato juice. There exist general purpose methods for measuring the color of various objects based on the three-stimuli system; however, they are too complicated and give no information as to internal color. The simplification of photo-electronic equipment is the basic reason for the wide application of two-stimuli (bichromatic) sorting in the hitherto used machines for automatic sorting of biological objects such as fruits and vegetables. These automatic machines, however, use the spectral characteristics of reflection and therefore sort only according to the external color.

A method is known for measuring the internal color of tomatoes which uses the spectral characteristics of transmission, where the object is illuminated successively with monochromatic light in the range of from two to four selected wavelengths. The directions of the light falling on the tomato and the received diffused light are at an angle of 90°, the tomato being placed on a support so that no reflected light will reach the photo-detector. This method, although suitable for measuring the internal color of tomatoes, is not good for automatic sorting, since with this particular arrangement of the light source and photo-detector, the latter practically cannot be protected from the light, reflected by the illuminated part of the tomato, which cause great errors. Besides, the information about the surface color of the tomatoes is not sufficient, since the green spots, if there are any on the opposite side of the light source or the photo-detector, are not included in the received light information.

It is therefore a general object of the present invention to avoid the drawbacks of the hitherto used methods for the automatic sorting of tomatoes by color, by means of an apparatus which can automatically sort the tomatoes according to their internal and external color with no need for the tomatoes to be peeled or cut beforehand.

This is achieved by a bichromatic method and apparatus wherein a source of white light S illuminates continuously the sorted tomato D from one side, the transmitted light flux being received in two directions T1 and T2, which are symmetrically situated at angles of 135° with respect to the direction of the light that falls on the tomato (incident direction). This in practice provides the reception of information on the internal and external colour in a space angle of $4\pi$, the errors due to falling of reflected light on to the photo-detector (in the beam T1 and T2) being eliminated (FIG. 1). If a green spot on the tomato is, in the worst case, on the side to the light source, the information about it will be included in the fluxes T1 and T2; in case it is on the side to T1 and T2, the information will be included in T1 or T2 respectively.

The disclosed method consists in the following: the light fluxes T1 and T2 are reflected by the mirrors O1 and O2 and are mixed by a semi-permeable mirror PO. If only the one half of the joint flux T/2 is used and then it is transmitted through two exchangeable light filters 650–670 millimicrons and through the range 550–520 millimicrons (depending on the destination and the sort composition of the tomatoes), then the ratio of the signals for two selected wavelengths $\lambda 1$ and $\lambda 2$ of these two spectral ranges will be a number characterizing the color of the tomatoes. For hot-house tomatoes for consumption in fresh condition the value $P = \lambda 1/\lambda 2$ gives the correlational coefficient $k=0.85-0.92$ in respect to the organoleptic evaluation of color. The correlational coefficient for ripe tomatoes intended for processing is about $k = 0.8$. With proper selection of the light filters the ratio $P$ for the tomatoes for consumption in fresh condition can be varied more than 100 times (FIG. 2a), while for the tomatoes for processing (FIG. 2b) this ratio cannot be varied more than 10 times. The variation of the signals within such a great range for tomatoes with negligable differences in color and ripeness allows an automatic sorting machine with high resolving capacity to be used.

Practice has shown that tomatoes for processing with apparently equal external color before peeling, can after peeling turn out to be different because of insufficiently ripe nervation. The disclosed method of sorting is absolutely suitable in this case, as this spectral characteristics of transmission include information for the kind of nervation too, and therefore the tomatoes sorted before peeling turn out, after peeling, to have been sorted correctly.

The disclosed method features also other advantages over methods for sorting by the reflected light, namely: the errors due to the influence of the reflecting surface of the tomatoes are eliminated; only two photo-detectors are used with a single light source being one; the illumination is obtained with white light which provides for a high ratio "signal-noise."

In a preferred embodiment, based on the disclosed method, a more detailed description is given of the automatic machine for sorting tomatoes by color. In the drawings:

FIG. 1 shows the directions of the transmitted light;
FIGS. 2A and 2B show the variation of the ratio P with wavelength;

In FIGS. 2a and 2b of the drawings, the ordinates have been labeled "P" and the abscissae have been labeled "$\lambda$-millimicrons." Lead lines have been added where necessary.

Figure 1:
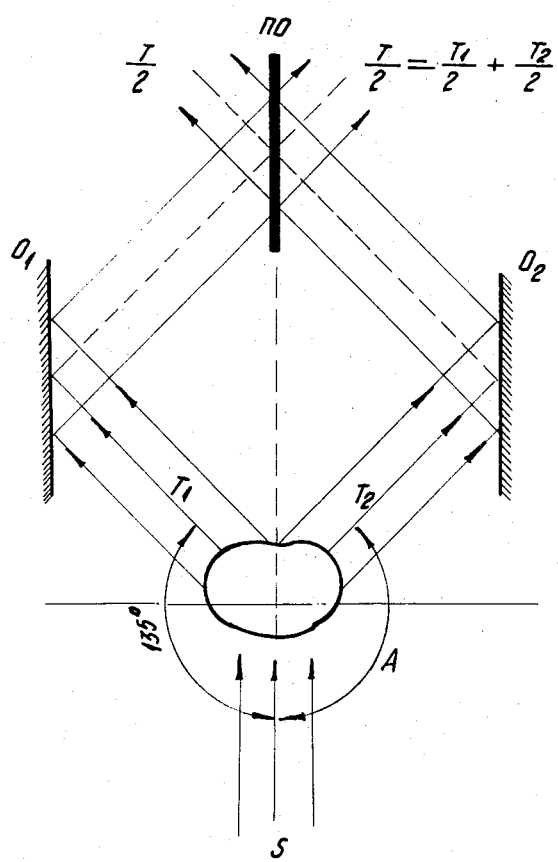
Figure 2B:
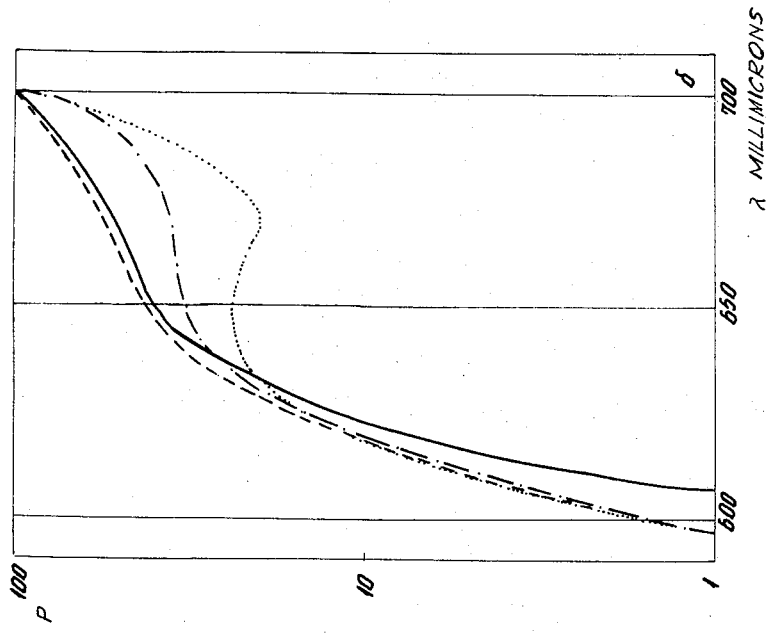
Figure 2A:
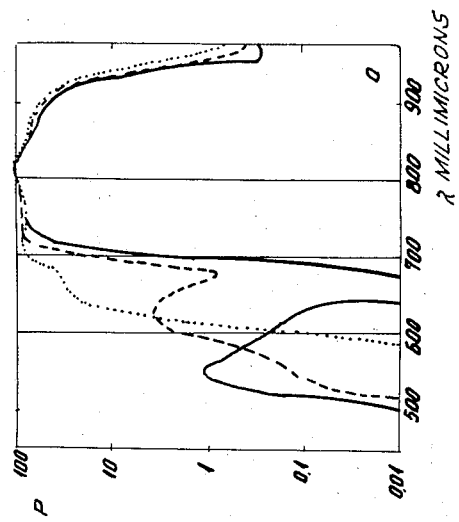
Figure 3:
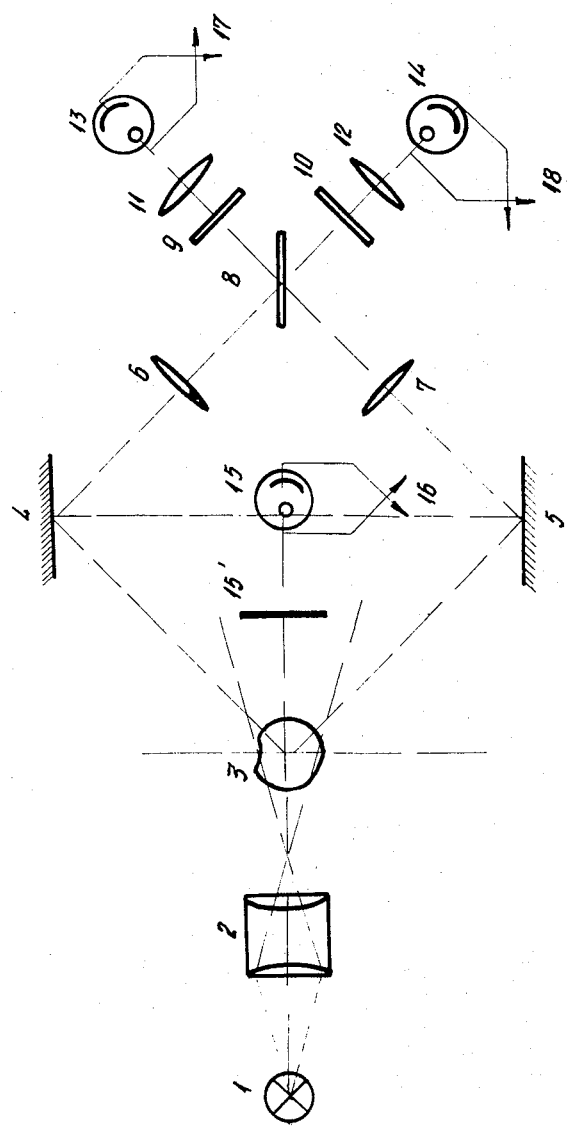
FIG. 3 shows the electron-optical chamber.

The lamp 1 illuminates by means of the condensor 2 the checked tomato 3. The light spot on the tomato is selected so as not to exceed the size of the smallest tomato, which can be checked. The received light information is perceived at an angle of 135° through the mirrors 4 and 5 and is directed through the lenses 6 and 7 toward the photo-receivers 13 and 14 (photocells or photo-multipliers). The two light fluxes are divided in equal parts and are then summed up by means of the semi-permeable mirror 8. The two resulting light fluxes pass through the interferent light filters 9 and 10 and being directed by the lenses 11 and 12 then fall on the photo-detectors 13 and 14. The tomatoes 3, carried by the conveying device fall one after the other gravitationally, perpendicularly to the plane of FIG. 3, into the center of the measuring position. When the tomato is exactly in that position, it interrupts the light beam, which is transmitted through the aperture 15' toward the synchronizing photocell 15. The latter produces a signal which determines the moment of measuring and its duration. The measuring takes place while the tomato is practically just in the measuring position. The optical system together with the photo-receivers is enclosed in a sealed-off hood, in order to protect them from dust and moisture.

Figure 4:
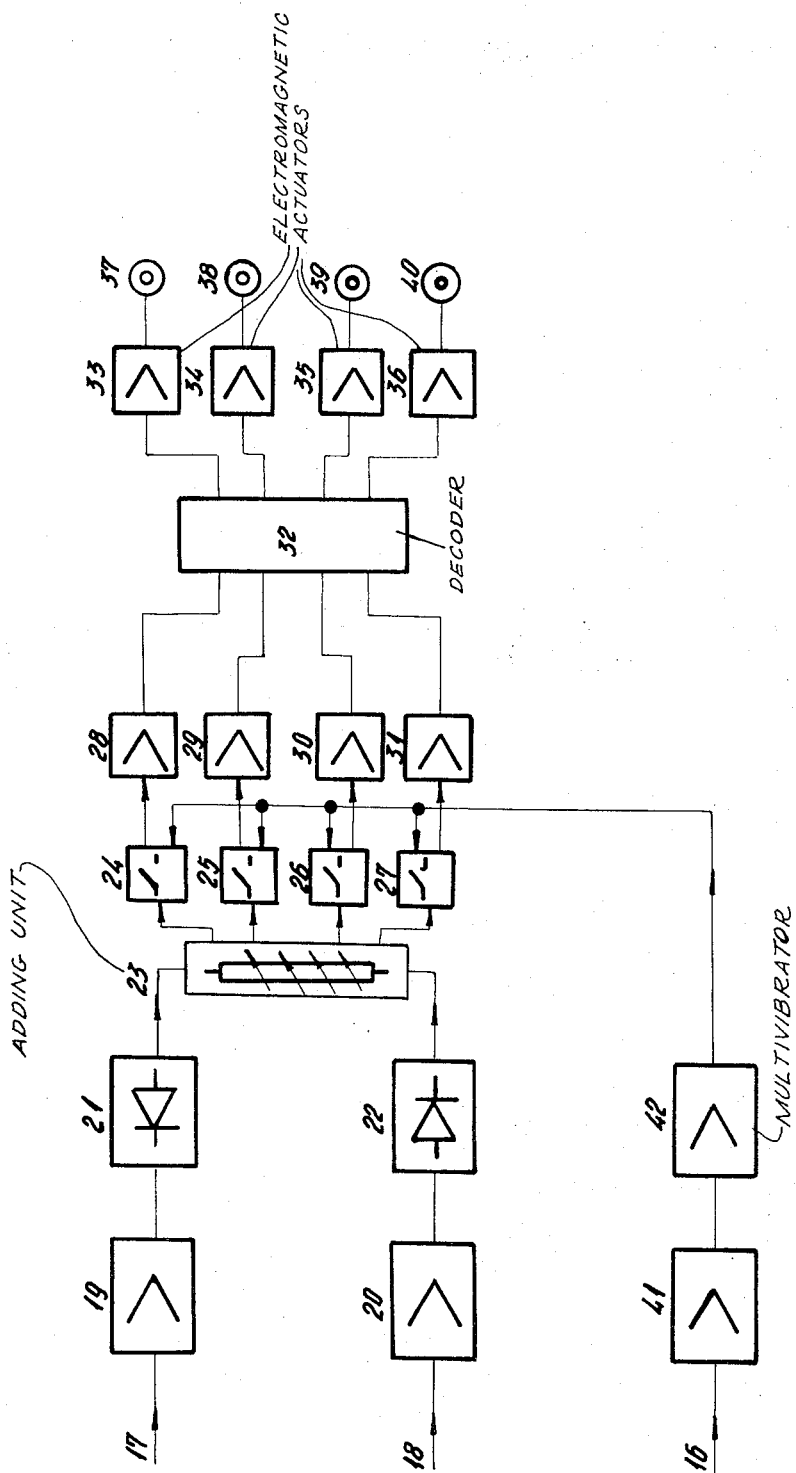
FIG. 4 is a structural scheme of the electronic equipment.

The elctrical signals from the two photo-receivers 13 and 14 through the connections 17 and 18 are fed to the two identical amplifiers 19 and 20 (FIG. 4); they are detected by the detectors 21 and 22 and pass on to the adding unit 23, which has four controllable outputs. The adding unit acts as a device for dividing the voltages. When the signal at any of the outputs is zero, then the ratios of the voltages to this output is zero. The rest of the outputs obtain voltages with different polarity, which means that the ratios of the signals is greater than one (e.g. negative polarity) or smaller than one (positive polarity). Only signals with negative polarity are fed to the electronic switches 24,25,26 and 27. In the case of green tomatoes a signal is fed only to switch 24, in the case of redder tomatoes a signal goes to switches 24 and 25, etc. With the reddest tomatoes signals are fed to the four switches 24,25,26 and 27. The switches are controlled by the signal of the photocell 15, which through connection 16 goes to the amplifier 41 and the waiting multivibrator 42. The latter determines the duration of the measuring impulse at the output of the electronic switches 24 - 27. The received signals are fed to amplifiers 28 – 31, and from there to the decoder 32. If a signal is fed only to one of the inputs of the decoder (e.g. from the electronic switch 24), a signal is received only in the output to the amplifier 33. If signals come from the electronic switches 24 and 25, an output signal is received only in the amplifier 34, etc. The amplifiers 33 – 36 have a relay function and a powerful putput signal which is fed in the electromagnetic actuating mechanisms 37 – 40. In the described embodiment these are powerful quick-acting electromagnetic valves, whose nozzles are situated symmetrically around the measuring position of the tomato 3 (which is not shown in FIG. 3) that blow it away with an air blast acting in four different directions depending on its color. Thus, up to the adding unit 23 the electronic part acts as an analogus device and then - as digital system. Using the same structural scheme the number of the fractions can easily be reduced or increased. Specific electrical circuits of the device are not given since they are obtained with the help of circuit variations, well known in electronics.

Figure 5:
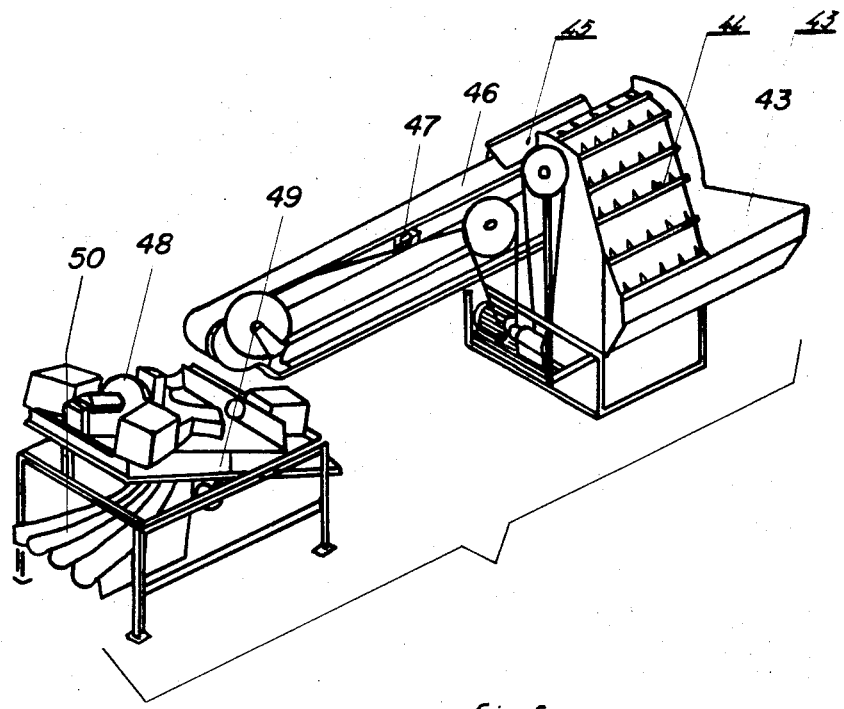
FIG. 5 shows the conveying and sorting part.

The section for conveying and sorting FIG. 5 consists of a hopper 43 for the tomatoes. From there they are picked by the metering elevator with carriers 44 and are poured in portions on a V-shaped rubber belt. The tomatoes are aligned and oriented in direction of the axis of symmetry by the static arranging plate 45, situated above one of the slopes of the V-shaped belt 46. The tomatoes fall in groups between the plate and the opposite movable slope of the V-shaped belt, whence they obtain a spinning motion and at the exit of the plate are spaced apart. The tomatoes with approximately round shape are almost at an equal distance from each other. The vibrating device 47 makes the belt oscillate perpendicularly to its own motion and thus completes the orientation of the tomatoes. The tomatoes fall along a path determinated by their initial velocity, they pass through the electronic-optical chamber 48, after which their trajectory changes in a direction set by the correspondingly actuated electromagnetic valve 49 so that they slide along the element of the dividing cone 50.

With other types of conveying and sorting devices, the tomatoes can be checked and sorted in two or three fractions on the very conveying device. Their diversion in one or other direction can be by pneumatic or mechanical means.

What is claimed is:

1. A method of sorting tomatoes comprising the steps of projecting an incident light beam into a succession of tomatoes; detecting light rays transmitted through each tomato exposed to the incident beam at an angle of about 135° to the incident light beam and on symmetrically opposite sides of the axis thereof; combining the detected light rays to form a combined light and spectrally analyzing the combined light to form a ratio of wave lengths in the visible spectra characteristic of the internal coloration of the tomatoes and surface characteristic in the regions thereof transluminated by said beam and said rays; and directing said tomatoes along different paths in accordance with said ratio.

2. An apparatus for sorting tomatoes for color comprising conveying means for advancing a succession of tomatoes along a path; means for projecting an incident light beam across said path and against the tomatoes successively advanced therealong; a pair of mirrors lying generally parallel to said incident beam but disposed symmetrically on opposite sides on the axis thereof beyond said path for interjecting light rays transmitted through each tomatoe at an angle of about 135° to the incident light beam; a semipermeable mirror receiving light rays simultaneously from both of the first mentioned mirrors for adding the light reflected by said first mirror and forming two analysis beams therefrom; respective lenses traversed by said analysis beams to form the same into pencils of light; respective filters in the paths of said analysis beams; respective photosensitive detectors responsive to each of said pencils for producing electrical signal representing the wave length of the light of said pencils; a circuit connected to said photosensitive detectors for forming a ratio between the output signals thereof; means for comparing a signal representing said ratio with predetermined threshold levels thereof; and respective electromagnetic actuators connected to the last-mentioned means for directing the tomatoes transluminated by said incident beam along respective paths in accordance with said ratio.

* * * * *